(12) United States Patent
Huang (10) Patent No.: US 6,707,223 B1
(45) Date of Patent: Mar. 16, 2004

(54) STATOR ASSEMBLY STRUCTURE (75) Inventor: Shu-Chen Huang, Taipei (TW)

(73) Assignee: Risun Expanse Corp., Taipei (TW)

( * ) Notice: Subject to any disclaimer, the term of this patent is extended or adjusted under 35 U.S.C. 154(b) by 0 days.

(21) Appl. No.: 10/395,257

(22) Filed: Mar. 25, 2003

(51) Int. Cl.[7] ............................................... H02K 1/12
(52) U.S. Cl. ......................... 310/254; 310/89; 310/91
(58) Field of Search ........................ 310/254, 71, 67 R, 310/68 R, 89, 90, 91

(56) References Cited

U.S. PATENT DOCUMENTS

| | | | | |
|---|---|---|---|---|
| 5,099,164 A | * | 3/1992 | Wheeler | 310/254 |
| 5,666,011 A | * | 9/1997 | Hong | 310/40.5 |
| 5,739,614 A | * | 4/1998 | Suzuki et al. | 310/180 |
| 6,118,198 A | * | 9/2000 | Hollenbeck et al. | 310/89 |
| 6,121,710 A | * | 9/2000 | Ho | 310/254 |
| 2002/0113519 A1 | * | 8/2002 | Brown | 310/254 |
| 2002/0149285 A1 | * | 10/2002 | Horng et al. | 310/254 |
| 2003/0062798 A1 | * | 4/2003 | Horng et al. | 310/254 |
| 2003/0067243 A1 | * | 4/2003 | Hollenbeck et al. | 310/254 |

* cited by examiner

Primary Examiner—Thanh Lam
(74) Attorney, Agent, or Firm—Birch, Stewart, Kolasch & Birch, LLP (57) ABSTRACT

A stator assembly structure has a latch and coupling design to assemble every element of the stator so that the stator structure may be disassembled and separated. The separated elements may be recycled according to their material nature to reduce waste of resources.

14 Claims, 8 Drawing Sheets

STATOR ASSEMBLY STRUCTURE

FIELD OF THE INVENTION

The invention relates to a stator assembly structure adopted for use on motors and particularly to a stator assembly structure, which is separable, to composed elements after having been disassembled for recycling according to the material nature of the elements.

BACKGROUND OF THE INVENTION

Motors have been developed and made for decades. They are used to transform electric energy to mechanical energy. Their application principle is to make electric current to flow through the coil of the armature to energy magnetic poles of the rotor to generate electromagnetic forces, and to produce a repulsive reaction with the magnetic poles of the stator to form a torque force to generate rotation. In recent years, with advances of technologies the motor has increasingly become an important actuator. Depending on different requirements, motor has evolved into many types. The stator structure also has a wide variety of selections, from the original natural magnets to laminated silicon steel sheets wound with coils to form the required magnetic poles.

The stator structure of the motor usually consists of a plurality of elements. Every element is fixedly assembled to form a fixed relationship with one another (such as bonding by adhesive). Such a structure has a big disadvantage. Whenever one of the elements is damaged or the whole stator structure is not usable, the stator structure cannot be disassembled for replacement, or the elements cannot be recycled and reclaimed. Hence the entire stator structure has to be treated as trash and discarded. The residual value of the stator structure is very low. It cannot be used repeatedly. Or the stator even has to be burned and melted to separate the various elements. Burning, melting and separating is expensive. As the awareness of environmental protection and conservation has increased significantly these days, the recycling approach mentioned above results in a great waste of resources and is against material classification requirements demanded in environmental protection.

SUMMARY OF THE INVENTION

The stator structure that adopts the conventional techniques cannot be disassembled and results in waste of resources. Therefore, the object of the invention is to provide a stator assembly structure that allows every element of the stator to be disassembled and completely separated. Then every element can be classified and recycled according to its material nature, to reduce the waste of resources. Thus the stator structure will not be discarded as trash and may be utilized repeatedly. Even burning, melting and separating costs may be saved. By merely classifying and recycling, material classification requirements for environmental protection can be met. In addition, production speed and convenience may be enhanced.

The stator assembly structure of the invention includes a base dock, a printed circuit board, a tubular member, an anchor pin and a top lid. The base dock has a fixed axle and a seat. The fixed axle is located on the top end of the seat and has a wedge trough and jutting latch members are located on the outer surface. The printed circuit board is coupled on the fixed axle. The tubular member has two ends each extending inwards to form retaining members corresponding to the latch members. One of the retaining members has a coupling trough corresponding to the wedge trough such, that when the tubular member is coupled on the printed circuit board and the fixed axle, it may be turned for an angle to make the latch member corresponding to the retaining member, and the wedge trough corresponding to the coupling trough.

The fixed pin is located in the wedge trough and the coupling trough to anchor the relative radial relationship between the base dock and the tubular member. The top lid has an opening and a bucking member located on the bottom section corresponding to the interior of the base dock. The top lid further has jutting lugs located on the peripheral surface, corresponding to the retaining members such that when the top lid is disposed between the top end of the fixed axle and the retaining members of the tubular member and is turned for an angle, the jutting lugs correspond to the retaining members to anchor the base dock and the tubular member in an axial relationship. The assembly thus constructed may be disassembled easily to become separated elements. The separated elements may be classified according to their material nature for recycling to reduce waste of resources. Therefore the stator structure may be utilized repeatedly without being thrown away as trash. Moreover, less money has to be spent on burning, melting and separating. By merely classifying and recycling, it can meet the material classification requirements demanded in environment protection. The invention increases production speed and convenience as well.

The foregoing, as well as additional objects, features and advantages of the invention will be more readily apparent from the following detailed description, which proceeds with reference to the accompanying drawings.

DESCRIPTION OF THE PREFERRED EMBODIMENT

The invention aims to provide a stator assembly structure that can be disassembled. The separated elements may be classified according to their material nature for recycling to reduce waste of resources.

Figure 1:
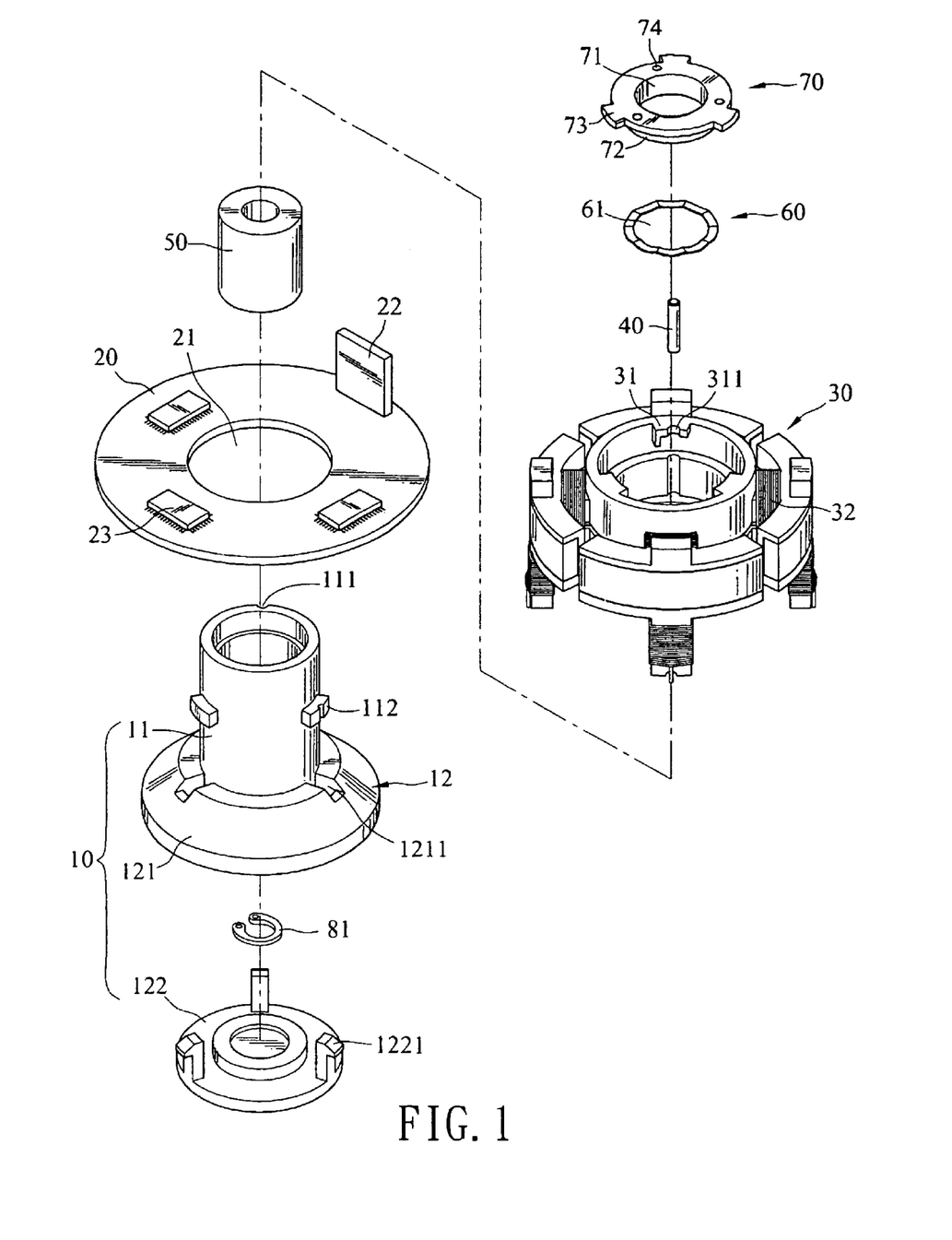
FIG. 1 is an exploded view of the invention.
Figure 2:
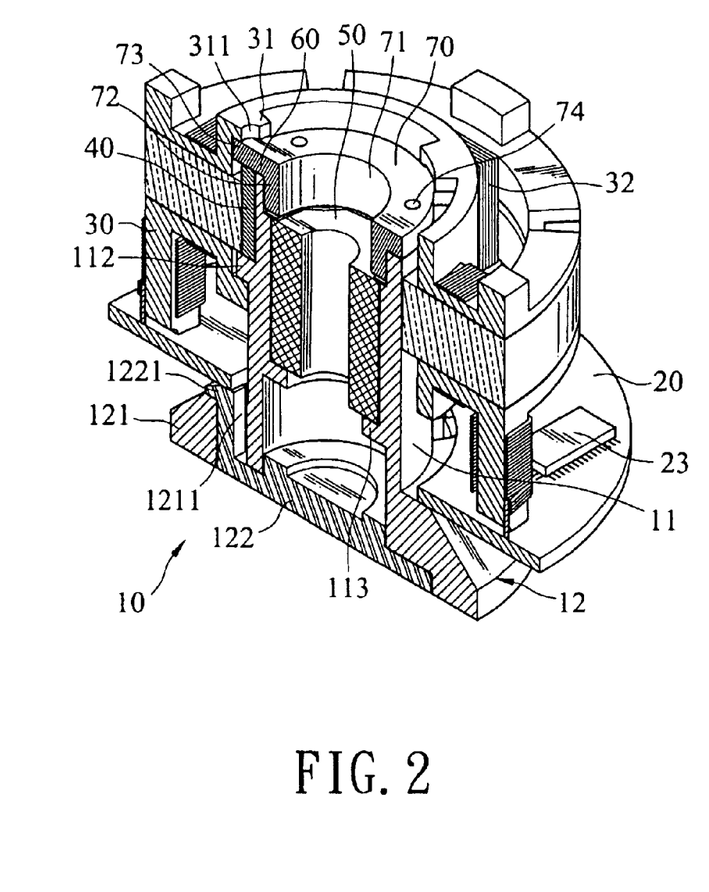
FIG. 2 is a sectional view of the invention.
Figure 3A:
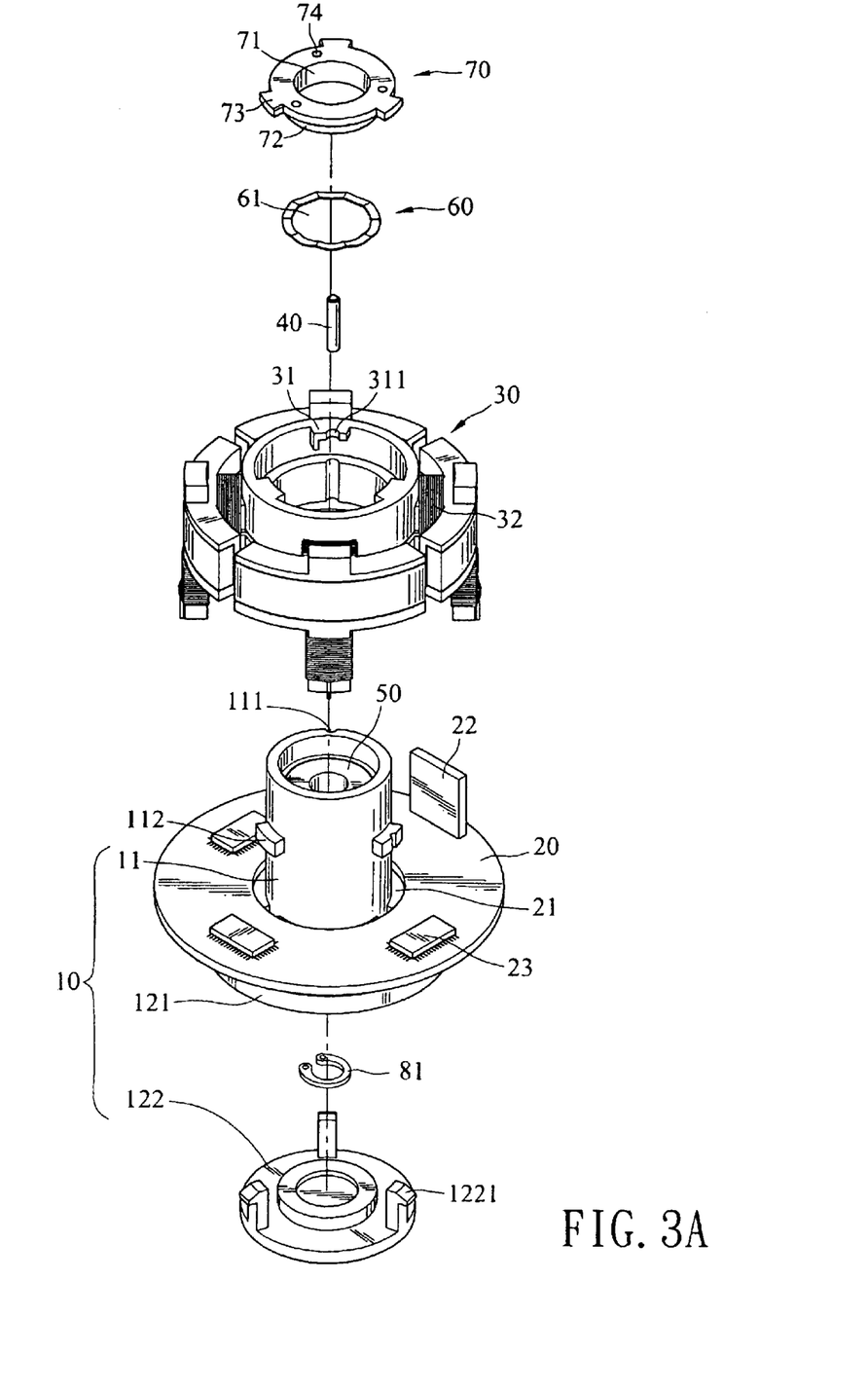
FIGS. 3A through 3F are schematic views, showing various coupling stages of the invention and the rotor.
Figure 3B:
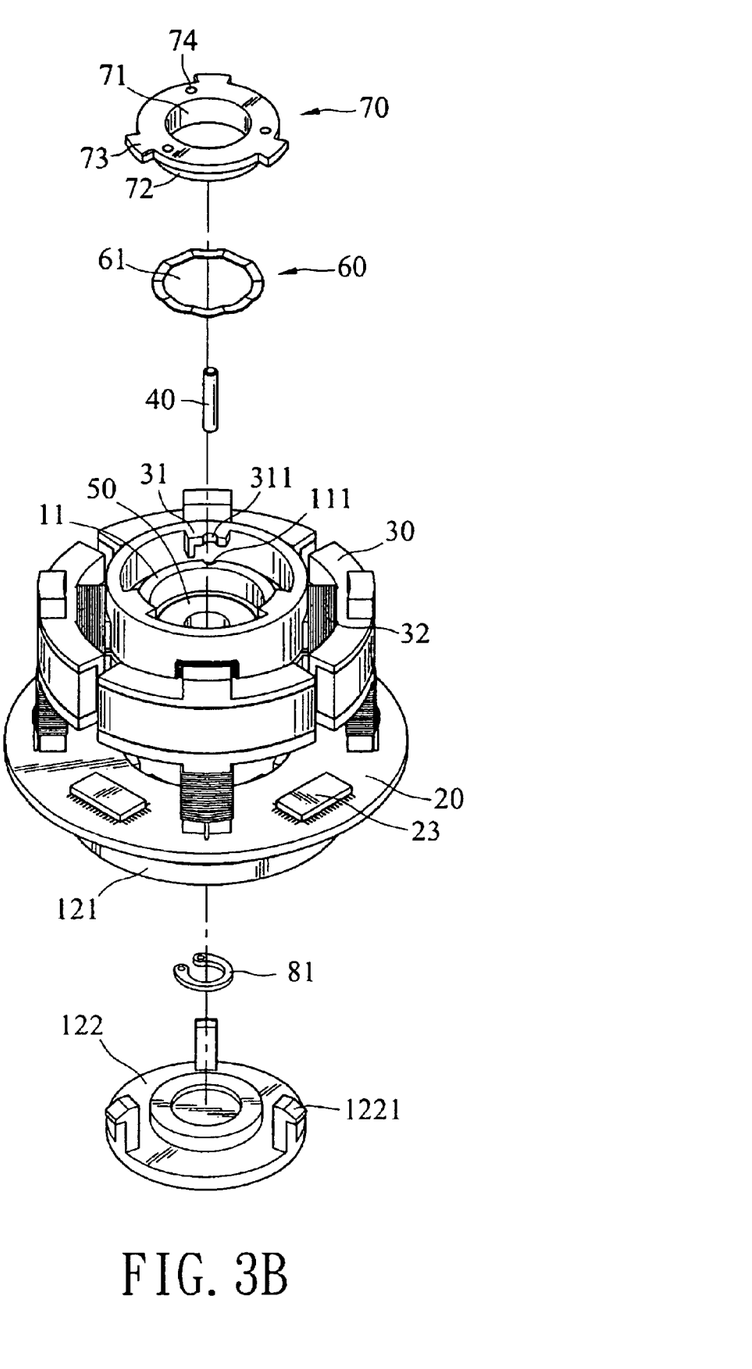
Figure 3C:
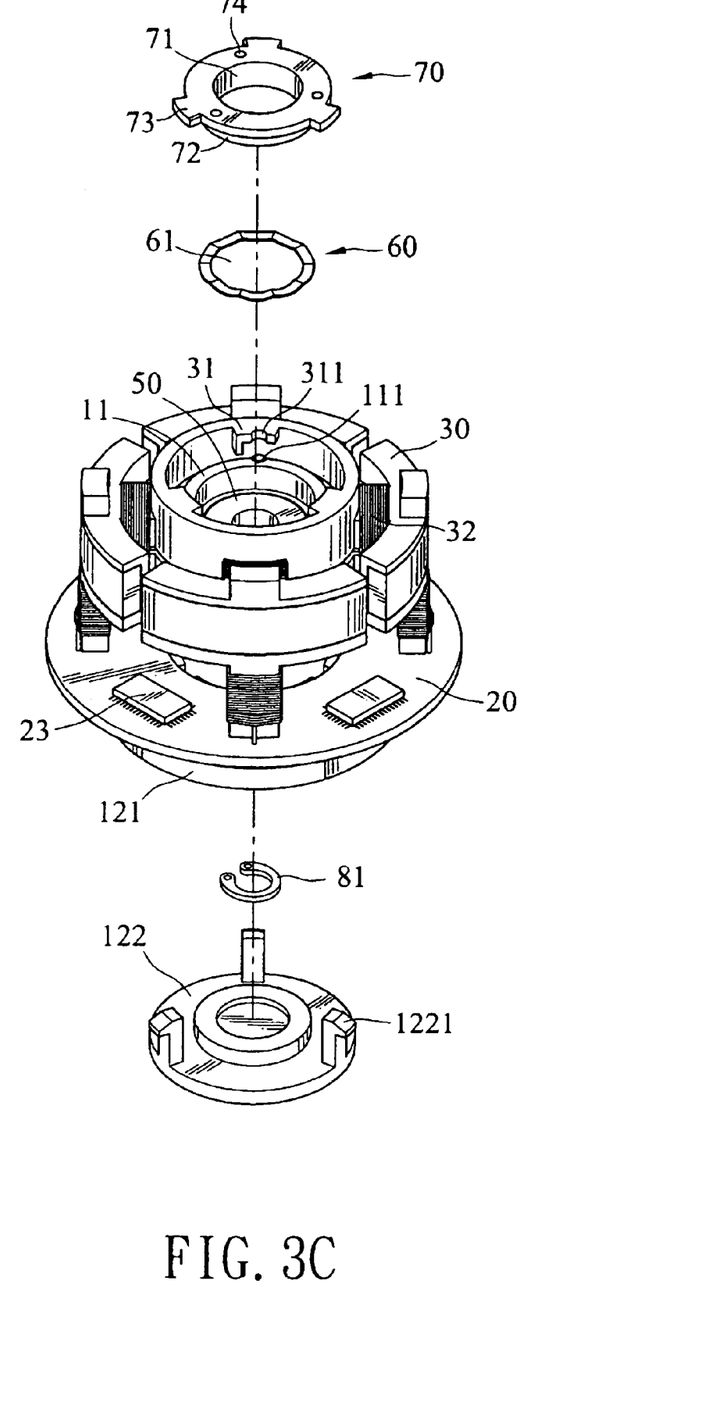
Figure 3D:
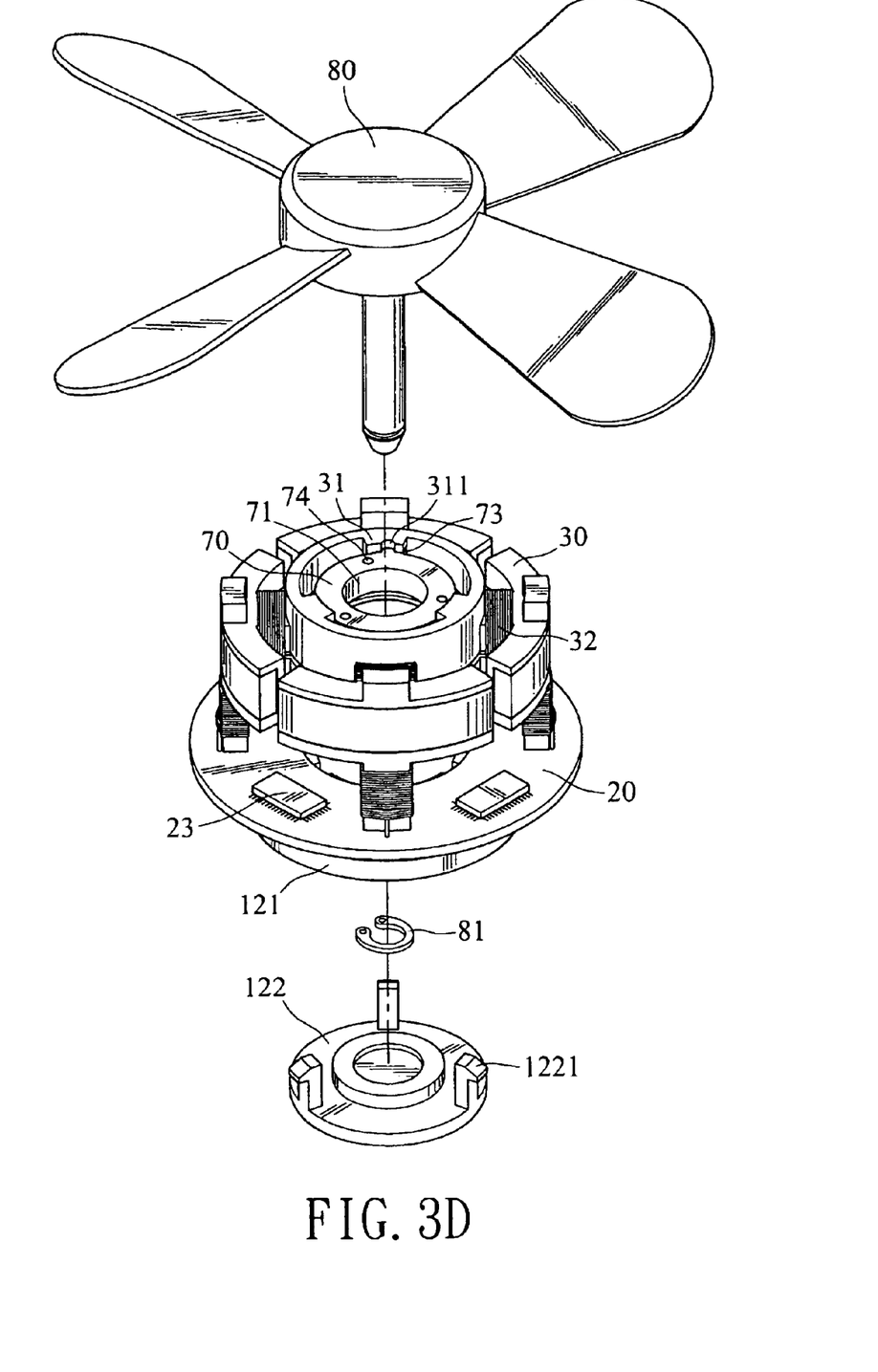
Figure 3E:
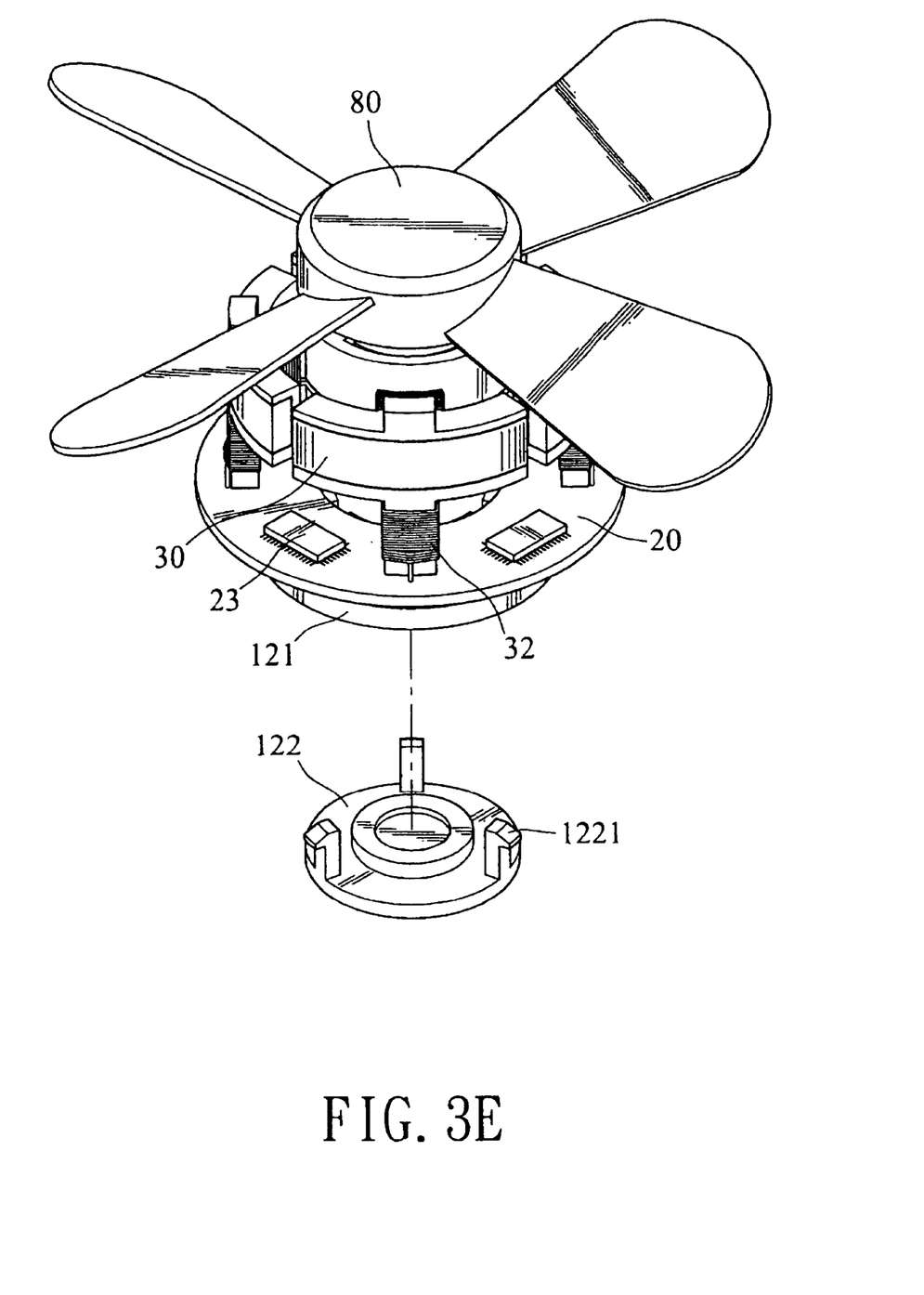
Figure 3F:
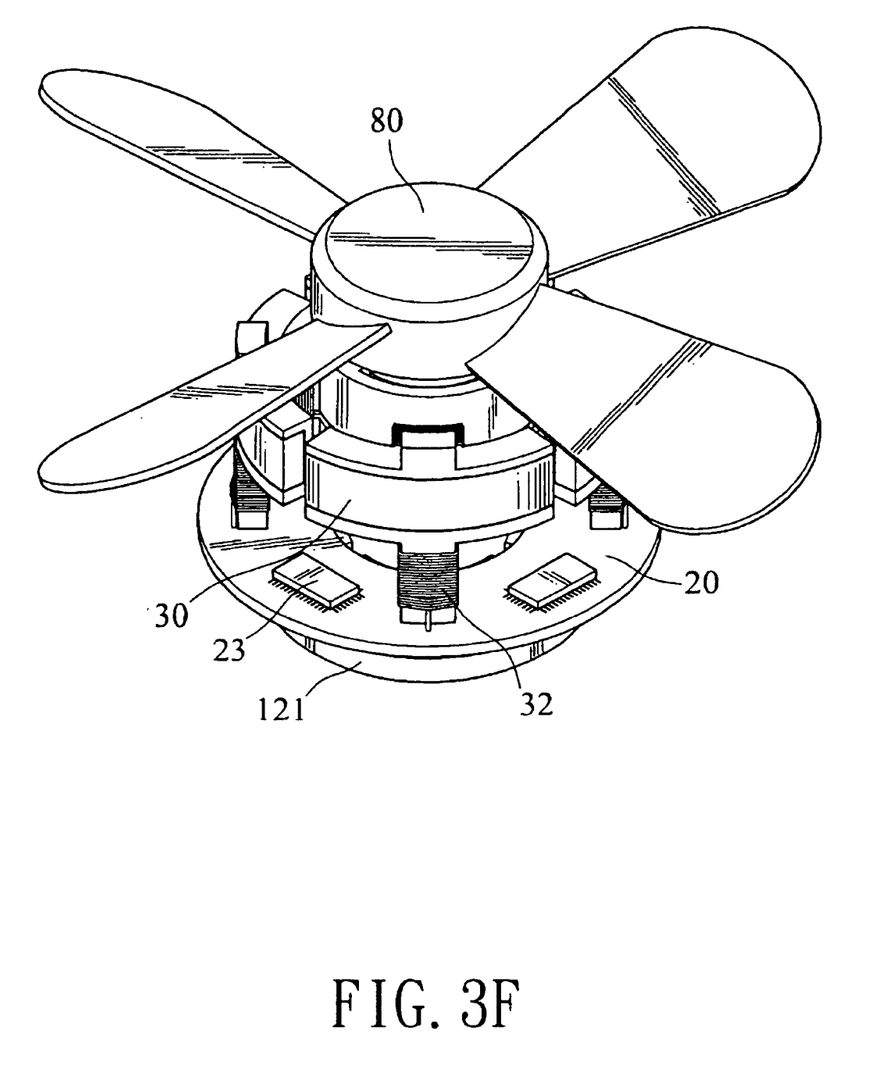

Referring to FIGS. 1 and 2, the stator assembly structure includes a base dock 10, a printed circuit board 20, a tubular member 30, an anchor pin 40, a bearing 50, an elastic element 60 and a top lid 70. The base dock 10 has a fixed axle 11 and a seat 12. The fixed axle 11 is located on the top end of the seat 12 and has a wedge trough 111 and jutting latch members 112 located on the outer surface thereof. The fixed axle 11 further has retaining members 113 located on the interior and extended inwards. The latch members 112 and the retaining members 113 are extended in the radial direction. The seat 12 has a seat flange 121 and a bottom lid 122. The seat flange 121 has apertures 1211 formed like preset grooves for releasing the injection mold. The bottom lid 122 has claws 1221 extending to engage with the apertures 1211 to couple with the seat 12.

The printed circuit board 20 has an opening 21 for coupling with the fixed axle 11. On the printed circuit board 20, there is a chip 22 mounted thereon and extended upwards. The chip 22 is located on the outer side relative to the tubular member 30 when the tubular member 30 is coupled on the base dock 10. The printed circuit board 20 further has a control element 23 located thereon.

The tubular member 30 has two ends each extending inwards to form retaining members 31 corresponding to the latch members 112. The retaining members 31 are extended in the radial direction. One of the retaining members 31 has a coupling trough 311 corresponding to the wedge trough 111. When the tubular member 30 is coupled on the printed circuit board 20 and the fixed axle 11, and is turned for an angle, the latch members 112 may correspond to the retaining members 31 with the wedge trough 111 corresponding to the coupling trough 311. Further, the tubular member 30 is wound by metal wires 32.

The anchor pin 40 is wedged in the wedge trough 111 and the coupling trough 311 to anchor the radial relationship between the base dock 10 and the tubular member 30.

The bearing 50 is located in the fixed axle 11 and retained by the retaining members 113 to avoid from dropping out of the bottom of the fixed axle 11.

The elastic element 60 is an elastic blade formed in an undulant shape and has an opening 61. It is located in the fixed axle 11 above the bearing 50 to form a bucking condition between the bearing 50 and the top lid 70.

The top lid 70 has an opening 70 and a bucking member 72 located on the bottom section thereof corresponding to the interior of the base dock 10. The top lid 70 has jutting lugs 73 formed on the outer peripheral rim and extended in the radial direction corresponding to the retaining members 31 so that when the top lid 70 is disposed between the top end of the fixed axle II and the retaining members 31 of the tubular member 30, and the bucking member 72 is located in the base dock 10, the top lid 70 may be turned for an angle to allow the jutting lugs 73 corresponding to the retaining members 31 to anchor the axial relationship between the base dock 10 and the tubular member 30. The top lid 70 further has round cavities 74 to facilitate operations of the tools to move the top lid 70.

Referring to FIGS. 2 and 3A through 3F, for assembly of the invention, first, couple the printed circuit board 20 on the fixed axle 11 through the opening 21. Next, dispose the bearing 50 in the fixed axle 11 until it is rested on the retaining members 113 without dropping out from the bottom of the fixed axle 11. Then couple the tubular member 30 on the fixed axle 11 and turn the tubular member 30 to make the retaining members 31 corresponding to the latch members 112 and the wedge trough 111 corresponding to the coupling trough 311, meanwhile the chip 22 located on the printed circuit board 20 is positioned on the outer side of the base dock 10 relative to the tubular member 30. Thereafter, insert the anchor pin 40 in the wedge trough 111 and the coupling trough 311 to anchor the radial relationship between the base dock 10 and the tubular member 30.

Then dispose the elastic element 60 in the fixed axle 11 above the bearing 50; place the top lid 70 between the top end of the fixed axle 11 and the retaining members 31 of the tubular member 30; turn the top lid 70 for an angle to make the jutting lugs 73 corresponding to the retaining members 31 to anchor the axial relationship between the base dock 10 and the tubular member 30 with the elastic element 60 sandwiched between the bearing 50 and the top lid 70, for forming a bucking condition.

Finally, a rotor 80 may be disposed through the opening 71 of the top lid 70 and the opening 61 of the elastic element 60 and be housed in the fixed axle 11 of the base dock 10 and the bearing 50. A C-shaped clip 81 may be coupled on the rotor 80 (not shown in the drawings). And the claws 1221 of the bottom lid 122 are connected to the apertures 1211 of the seat flange 121 (not shown in the drawings), for completing the assembly.

By means of the construction set forth above, the stator assembly structure of the invention may be completely disassembled to become separated elements. The separated elements may he classified according to their material nature for recycling to reduce waste of resources. Therefore the stator structure may be utilized repeatedly without being thrown away as trash. Moreover, the costs of burning, melting and separating may be saved. By merely classifying and recycling, it can meet the material classification requirements demanded in environmental protection.

In addition, the design of the invention can increase production speed and convenience.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A stator assembly structure, comprising:
   a base dock having a fixed axle and a seat, the fixed axle being located on a top end of the seat, and having a wedge trough and a plurality of jutting latch members located on the outer surface thereof;
   a printed circuit board coupled on the fixed axle;
   a tubular member having two ends each extending inwards to form a plurality of retaining members corresponding to the latch members, one of the retaining members having a coupling trough corresponding to the wedge trough such that when the tubular member is coupled on the printed circuit board and the fixed axle and turned for a selected angle the latch members correspond to the retaining members and the wedge trough corresponds to the coupling trough;
   an anchor pin located in the wedge trough and the coupling trough to anchor the radial relationship between the base dock and the tubular member; and
   a top lid having an opening, a bucking member located on a bottom section thereof corresponding to the interior of the base dock, and a plurality of jutting lugs formed on the outer peripheral rim thereof corresponding to the retaining members such that when the top lid is disposed between the top end of the fixed axle and the retaining members of the tubular member, and the bucking member is located in the base dock, the top lid is turnable for a selected angle to allow the jutting lugs corresponding to the retaining members to anchor the axial relationship between the base dock and the tubular member.

2. The stator assembly structure of claim 1, wherein the seat has a seat flange and a bottom lid, the seat flange having a plurality of apertures, the bottom lid having a plurality of claws extending to engage with the apertures to complete assembly of the seat.

3. The stator assembly structure of claim 1, wherein the fixed axle of the base dock further has a plurality of protrusive retaining members located on the interior thereof.

4. The stator assembly structure of claim 3 further having a bearing located in the interior of the fixed axle and rested on the retaining members without dropping out from the bottom of the fixed axle.

5. The stator assembly structure of claim 4 further having an elastic element which has an opening and is located in the fixed axle above the bearing to maintain a bucking condition between the bearing and the top lid.

6. The stator assembly structure of claim 5, wherein the elastic element is an elastic blade formed in an undulant shape.

7. The stator assembly structure of claim 3, wherein the retaining members are extended radically.

8. The stator assembly structure of claim 1, wherein the latch members of the fixed axle are extended radically.

9. The stator assembly structure of claim 1, wherein the printed circuit board has a chip mounted thereon and extended upwards, the chip being located on an outer side relative to the tubular member when the tubular member is coupled on the base dock.

10. The stator assembly structure of claim 1, wherein the printed circuit board has a control element located thereon.

11. The stator assembly structure of claim 1, wherein the printed circuit board has an opening for coupling with the fixed axle.

12. The stator assembly structure of claim 1, wherein the retaining members of the tubular member are extended radically.

13. The stator assembly structure of claim 1, wherein the jutting lugs of the top lid are extended radically.

14. The stator assembly structure of claim 1, wherein the tubular member is wound by a metal wire.

* * * * *